(12) United States Patent
Fukuda

(10) Patent No.: US 12,471,871 B2
(45) Date of Patent: Nov. 18, 2025

(54) IMAGE PROCESSING DEVICE, IMAGE PROCESSING METHOD, AND IMAGE PROCESSING PROGRAM TO REDUCE INFLUENCE OF ARTIFACTS IN CONTRAST IMAGING

(71) Applicant: FUJIFILM CORPORATION, Tokyo (JP)

(72) Inventor: Wataru Fukuda, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 358 days.

(21) Appl. No.: 17/822,137

(22) Filed: Aug. 25, 2022

(65) Prior Publication Data

US 2023/0105941 A1    Apr. 6, 2023

(30) Foreign Application Priority Data

Sep. 30, 2021 (JP) ................. 2021-162032

(51) Int. Cl.
*A61B 6/00* (2006.01)
(52) U.S. Cl.
CPC ............ *A61B 6/5258* (2013.01); *A61B 6/481* (2013.01)
(58) Field of Classification Search
CPC ..... A61B 6/5258; A61B 6/481; G06T 7/0012; G06T 6/502; G06T 11/005; G06T 5/50;
(Continued)

(56) References Cited

U.S. PATENT DOCUMENTS

2006/0269040 A1   11/2006   Mertelmeier
2012/0224668 A1    9/2012   Baetz et al.
(Continued)

FOREIGN PATENT DOCUMENTS

JP   H01-147350 A     6/1989
JP   2011250969 A  * 12/2011
(Continued)

OTHER PUBLICATIONS

English language translation of the following: Office action dated Jan. 21, 2025 from the JPO in a Japanese patent application No. 2021-162032 corresponding to the instant patent application. This office action translation is submitted now in order to supplement the understanding of the cited references which are being disclosed in the instant Information Disclosure Statement.
(Continued)

*Primary Examiner* — John Villecco
*Assistant Examiner* — Kyla Guan-Ping Tiao Allen
(74) *Attorney, Agent, or Firm* — SOLARIS Intellectual Property Group, PLLC

(57) ABSTRACT

A processor of an image processing device acquires a low-energy image captured by irradiating an object, into which a contrast medium has been injected, with radiation having first energy emitted from a radiation source and detecting the radiation with a radiation detector, a high-energy image captured by irradiating the object with radiation having second energy higher than the first energy emitted from the radiation source and detecting the radiation with the radiation detector, and a first difference image indicating a difference between the high-energy image and the low-energy image, specifies an artifact region including an artifact from the first difference image, and generates a second difference image which indicates the difference between the high-energy image and the low-energy image and in which an influence of an artifact component caused by the artifact has been suppressed on the basis of the artifact region.

9 Claims, 8 Drawing Sheets

(58) Field of Classification Search
CPC .......... G06T 2207/20224; G16H 30/40; G16H 30/20; G16H 50/20
See application file for complete search history.

(56) References Cited

U.S. PATENT DOCUMENTS

| | | | |
|---|---|---|---|
| 2016/0000396 A1 | 1/2016 | Taguchi et al. | |
| 2016/0350923 A1 | 12/2016 | Muraoka et al. | |
| 2017/0071571 A1* | 3/2017 | Lee | A61B 8/085 |
| 2017/0245822 A1* | 8/2017 | Vaillant | A61B 5/7289 |
| 2018/0293763 A1 | 10/2018 | Keeler | |
| 2019/0380670 A1 | 12/2019 | Hofmann | |
| 2020/0260942 A1* | 8/2020 | Kubo | A61B 1/0655 |
| 2020/0305830 A1 | 10/2020 | Takahashi | |
| 2020/0408704 A1* | 12/2020 | Iwashita | A61B 6/4241 |
| 2021/0093280 A1 | 4/2021 | Hamauzu et al. | |

FOREIGN PATENT DOCUMENTS

| | | | | |
|---|---|---|---|---|
| JP | 2014087522 A | * | 5/2014 | |
| JP | 2016-026556 A | | 2/2016 | |
| JP | 2016106938 A | * | 6/2016 | |
| JP | 2016-214725 A | | 12/2016 | |
| JP | 2019-4920 A | | 1/2019 | |
| JP | 2019-162358 A | | 9/2019 | |
| JP | 6623832 B2 | * | 12/2019 | ............ G06T 5/001 |
| JP | 2020-512900 A | | 4/2020 | |
| JP | 2020-162972 A | | 10/2020 | |
| JP | 2021-052957 A | | 4/2021 | |

OTHER PUBLICATIONS

English language translation of the following: Office action dated May 7, 2025 from the JPO in a Japanese patent application No. 2021-162032 corresponding to the instant patent application. This office action translation is submitted now in order to supplement the understanding of the cited references which are being disclosed in the instant Information Disclosure Statement.

* cited by examiner

# IMAGE PROCESSING DEVICE, IMAGE PROCESSING METHOD, AND IMAGE PROCESSING PROGRAM TO REDUCE INFLUENCE OF ARTIFACTS IN CONTRAST IMAGING

CROSS-REFERENCE TO RELATED APPLICATIONS

The present application claims priority under 35 U.S.C. § 119 to Japanese Patent Application No. 2021-162032 filed on Sep. 30, 2021. The above application is hereby expressly incorporated by reference, in its entirety, into the present application.

BACKGROUND

1. Technical Field

The present disclosure relates to an image processing device, an image processing method, and an image processing program.

2. Description of the Related Art

A technique is known in which contrast imaging that irradiates an object, into which a contrast medium has been injected, with radiation having different energy levels to capture a low-energy image and a high-energy image is performed and a difference image indicating a difference between the high-energy image and the low-energy image is generated to generate a radiographic image in which the contrast medium has been emphasized.

In addition, in some cases, an artifact may be included in the radiographic image together with the object. Therefore, a technique for specifying an artifact included in a radiographic image is known (see, for example, JP2021-52957A).

SUMMARY

Artifacts tend to be composed of materials such as metal having a relatively high radiation absorbance. A radiographic image including an artifact is an image that is affected by an artifact component caused by the artifact.

The present disclosure has been made in view of the above circumstances, and an object of the present disclosure is to provide an image processing device, an image processing method, and an image processing program that can obtain a difference image in which a contrast medium is clearly shown and an influence of an artifact component caused by an artifact has been suppressed in contrast imaging.

In order to achieve the above object, according to a first aspect of the present disclosure, there is provided an image processing device comprising at least one processor. The processor acquires a low-energy image captured by irradiating an object, into which a contrast medium has been injected, with radiation having first energy emitted from a radiation source and detecting the radiation with a radiation detector, a high-energy image captured by irradiating the object with radiation having second energy higher than the first energy emitted from the radiation source and detecting the radiation with the radiation detector, and a first difference image indicating a difference between the high-energy image and the low-energy image, specifies an artifact region including an artifact from the first difference image, and generates a second difference image which indicates the difference between the high-energy image and the low-energy image and in which an influence of an artifact component caused by the artifact has been suppressed on the basis of the artifact region.

According to a second aspect of the present disclosure, in the image processing device according to the first aspect, the processor may perform image processing based on the artifact region on the first difference image to generate the second difference image.

According to a third aspect of the present disclosure, in the image processing device according to the first aspect, the processor may generate the second difference image from the high-energy image and from the low-energy image on the basis of the artifact region.

According to a fourth aspect of the present disclosure, in the image processing device according to the third aspect, the processor may perform image processing based on the artifact region on the high-energy image and on the low-energy image to generate the second difference image indicating a difference between the high-energy image and the low-energy image subjected to the image processing.

According to a fifth aspect of the present disclosure, in the image processing device according to the second aspect or the fourth aspect, the image processing may be an emphasis process that emphasizes a region other than the artifact region more than the artifact region.

According to a sixth aspect of the present disclosure, in the image processing device according to the third aspect, the processor may generate the second difference image which indicates the difference between the high-energy image and the low-energy image and in which a pixel value of the artifact region is smaller than a pixel value of the artifact region in the first difference image.

According to a seventh aspect of the present disclosure, in the image processing device according to any one of the first to sixth aspects, the processor may perform an artifact recognition process on the first difference image to specify the artifact region.

According to an eighth aspect of the present disclosure, in the image processing device according to any one of the first to sixth aspects, the processor may set a pixel that has a pixel value equal to or greater than a threshold value determined according to the contrast medium or the artifact from the first difference image as a pixel of the artifact region.

According to a ninth aspect of the present disclosure, in the image processing device according to any one of the first to sixth aspects, the processor may set a pixel, whose brightness value in the first difference image is equal to or greater than a predetermined value and whose brightness value in the low-energy image is larger than a brightness value in the high-energy image, as a pixel of the artifact region.

Further, in order to achieve the above object, according to a tenth aspect of the present disclosure, there is provided an image processing device comprising at least one processor. The processor acquires a first difference image indicating a difference between a low-energy image captured by irradiating an object, into which a contrast medium has been injected, with radiation having first energy emitted from a radiation source and detecting the radiation with a radiation detector, and a high-energy image captured by irradiating the object with radiation having second energy higher than the first energy emitted from the radiation source and detecting the radiation with the radiation detector in contrast imaging that acquires the low-energy image and the high-energy image, specifies a pixel that has a pixel value equal to or greater than a threshold value determined according to the contrast medium or an artifact from the first difference image as a pixel of an artifact region including the artifact, and performs image processing based on the artifact region on the first difference image to generate a second difference image in which an influence of an artifact component caused by the artifact has been suppressed.

Furthermore, in order to achieve the above object, according to an eleventh aspect of the present disclosure, there is provided an image processing device comprising at least one processor. The processor acquires a first difference image indicating a difference between a low-energy image captured by irradiating an object, into which a contrast medium has been injected, with radiation having first energy emitted from a radiation source and detecting the radiation with a radiation detector, and a high-energy image captured by irradiating the object with radiation having second energy higher than the first energy emitted from the radiation source and detecting the radiation with the radiation detector in contrast imaging that acquires the low-energy image and the high-energy image, performs an artifact recognition process on the first difference image to specify an artifact region including an artifact, and generates a second difference image which indicates the difference between the high-energy image and the low-energy image and in which an influence of an artifact component caused by the artifact has been suppressed on the basis of the artifact region.

Moreover, in order to achieve the above object, according to a twelfth aspect of the present disclosure, there is provided an image processing method executed by a computer. The image processing method comprises: acquiring a low-energy image captured by irradiating an object, into which a contrast medium has been injected, with radiation having first energy emitted from a radiation source and detecting the radiation with a radiation detector, a high-energy image captured by irradiating the object with radiation having second energy higher than the first energy emitted from the radiation source and detecting the radiation with the radiation detector, and a first difference image indicating a difference between the high-energy image and the low-energy image; specifying an artifact region including an artifact from the first difference image; and generating a second difference image which indicates the difference between the high-energy image and the low-energy image and in which an influence of an artifact component caused by the artifact has been suppressed on the basis of the artifact region.

In addition, in order to achieve the above object, according to a thirteenth aspect of the present disclosure, there is provided an image processing method executed by a computer. The image processing method comprises: acquiring a first difference image indicating a difference between a low-energy image captured by irradiating an object, into which a contrast medium has been injected, with radiation having first energy emitted from a radiation source and detecting the radiation with a radiation detector, and a high-energy image captured by irradiating the object with radiation having second energy higher than the first energy emitted from the radiation source and detecting the radiation with the radiation detector in contrast imaging that acquires the low-energy image and the high-energy image; specifying a pixel that has a pixel value equal to or greater than a threshold value determined according to the contrast medium or an artifact from the first difference image as a pixel of an artifact region including the artifact; and performing image processing based on the artifact region on the first difference image to generate a second difference image in which an influence of an artifact component caused by the artifact has been suppressed.

Further, in order to achieve the above object, according to a fourteenth aspect of the present disclosure, there is provided an image processing method executed by a computer. The image processing method comprises: acquiring a first difference image indicating a difference between a low-energy image captured by irradiating an object, into which a contrast medium has been injected, with radiation having first energy emitted from a radiation source and detecting the radiation with a radiation detector, and a high-energy image captured by irradiating the object with radiation having second energy higher than the first energy emitted from the radiation source and detecting the radiation with the radiation detector in contrast imaging that acquires the low-energy image and the high-energy image; performing an artifact recognition process on the first difference image to specify an artifact region including an artifact; and generating a second difference image which indicates the difference between the high-energy image and the low-energy image and in which an influence of an artifact component caused by the artifact has been suppressed on the basis of the artifact region.

Furthermore, in order to achieve the above object, according to a fifteenth aspect of the present disclosure, there is provided an image processing program that causes a computer to execute a process comprising: acquiring a low-energy image captured by irradiating an object, into which a contrast medium has been injected, with radiation having first energy emitted from a radiation source and detecting the radiation with a radiation detector, a high-energy image captured by irradiating the object with radiation having second energy higher than the first energy emitted from the radiation source and detecting the radiation with the radiation detector, and a first difference image indicating a difference between the high-energy image and the low-energy image; specifying an artifact region including an artifact from the first difference image; and generating a second difference image which indicates the difference between the high-energy image and the low-energy image and in which an influence of an artifact component caused by the artifact has been suppressed on the basis of the artifact region.

Moreover, in order to achieve the above object, according to a sixteenth aspect of the present disclosure, there is provided an image processing program that causes a computer to execute a process comprising: acquiring a first difference image indicating a difference between a low-energy image captured by irradiating an object, into which a contrast medium has been injected, with radiation having first energy emitted from a radiation source and detecting the radiation with a radiation detector, and a high-energy image captured by irradiating the object with radiation having second energy higher than the first energy emitted from the radiation source and detecting the radiation with the radiation detector in contrast imaging that acquires the low-energy image and the high-energy image; specifying a pixel that has a pixel value equal to or greater than a threshold value determined according to the contrast medium or an artifact from the first difference image as a pixel of an artifact region; and performing image processing based on the artifact region on the first difference image to generate a second difference image in which an influence of an artifact component caused by the artifact has been suppressed.

In addition, in order to achieve the above object, according to a seventeenth aspect of the present disclosure, there is provided an image processing program that causes a computer to execute a process comprising: acquiring a first difference image indicating a difference between a low-energy image captured by irradiating an object, into which a contrast medium has been injected, with radiation having first energy emitted from a radiation source and detecting the radiation with a radiation detector, and a high-energy image captured by irradiating the object with radiation having second energy higher than the first energy emitted from the radiation source and detecting the radiation with the radiation detector in contrast imaging that acquires the low-energy image and the high-energy image; performing an artifact recognition process on the first difference image to specify an artifact region including an artifact; and generating a second difference image which indicates the difference between the high-energy image and the low-energy image and in which an influence of an artifact component caused by the artifact has been suppressed on the basis of the artifact region.

According to the present disclosure, it is possible to obtain a difference image in which a contrast medium is clearly shown and an influence of an artifact component by an artifact has been suppressed in contrast imaging.

BRIEF DESCRIPTION OF THE DRAWINGS

Exemplary embodiments according to the technique of the present disclosure will be described in detail based on the following figures, wherein.

DETAILED DESCRIPTION

Hereinafter, an embodiment of the present disclosure will be described in detail with reference to the drawings. In addition, this embodiment does not limit the present disclosure.

Figure 1:
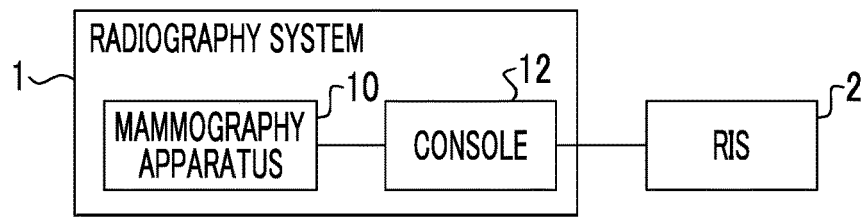
FIG. 1 is a schematic diagram illustrating an example of an overall configuration of a radiography system according to an embodiment.

First, an example of an overall configuration of a radiography system according to this embodiment will be described. FIG. 1 is a diagram illustrating an example of the overall configuration of a radiography system 1 according to this embodiment. As illustrated in FIG. 1, the radiography system 1 according to this embodiment comprises a mammography apparatus 10 and a console 12. The mammography apparatus 10 according to this embodiment is an example of a radiography apparatus according to the present disclosure. In addition, the console 12 according to this embodiment is an example of an image processing device according to the present disclosure.

Figure 2:
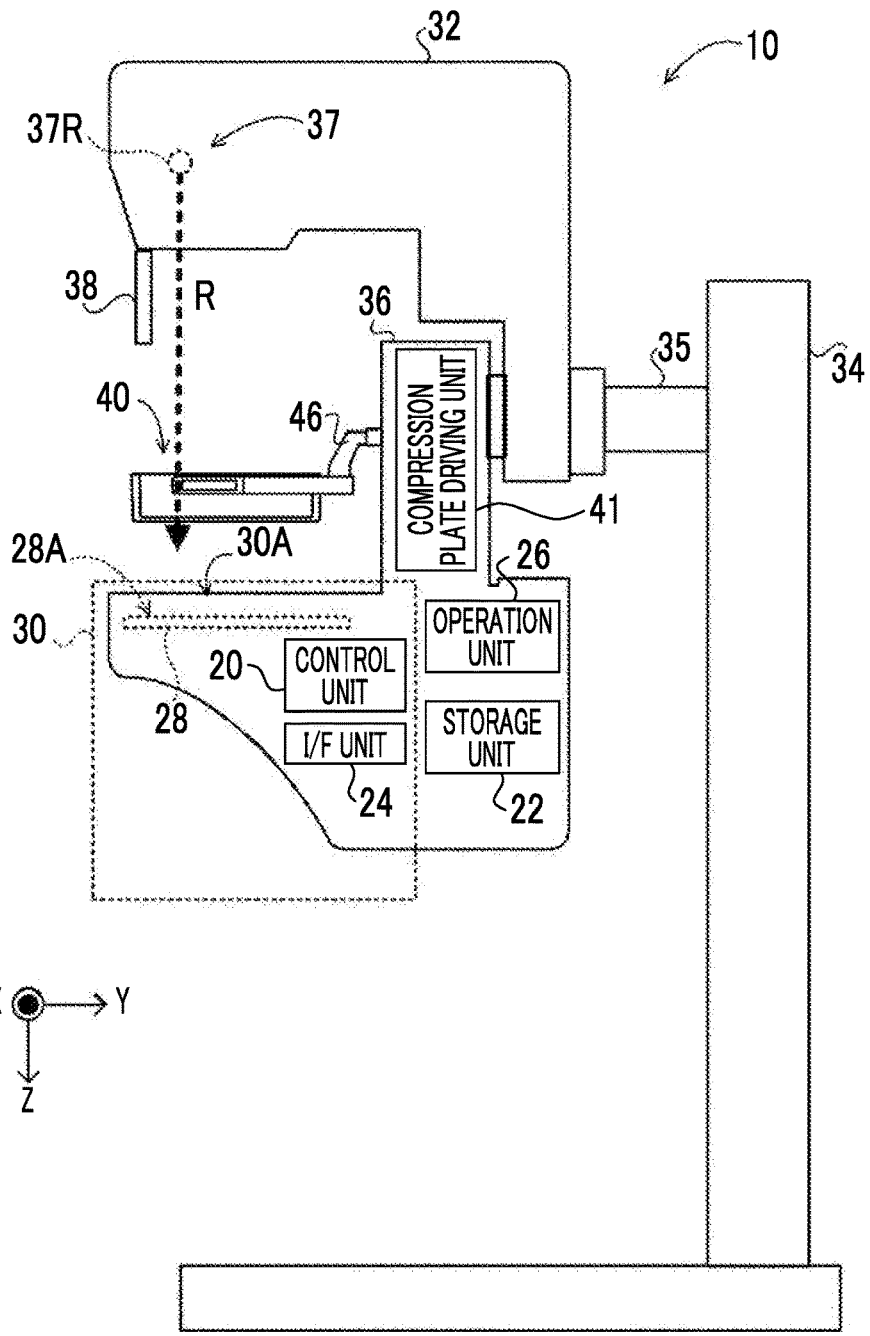
FIG. 2 is a side view illustrating an example of an outward appearance of a mammography apparatus according to the embodiment.

First, the mammography apparatus 10 according to this embodiment will be described. FIG. 2 is a side view illustrating an example of an outward appearance of the mammography apparatus 10 according to this embodiment. In addition, FIG. 2 illustrates an example of the outward appearance of the mammography apparatus 10 as viewed from a right side of a subject.

The mammography apparatus 10 according to this embodiment irradiates a breast of the subject as an object with radiation R (for example, X-rays) to capture a radiographic image of the breast. In addition, the mammography apparatus 10 may be an apparatus that images the breast of the subject not only in a state in which the subject is standing (standing state) but also in a state in which the subject is sitting on, for example, a chair (including a wheelchair) (sitting state).

In addition, an operation unit 26 is provided as a plurality of switches in, for example, an imaging table 30 of the mammography apparatus 10. Further, the operation unit 26 may be provided as a touch panel switch or may be provided as a foot switch that is operated by a foot of a user such as a doctor or a radiology technician.

As illustrated in FIG. 2, the mammography apparatus 10 according to this embodiment comprises a control unit 20, a storage unit 22, and an interface (I/F) unit 24 which are provided in the imaging table 30. The control unit 20 controls the overall operation of the mammography apparatus 10 under the control of the console 12. The control unit 20 comprises a central processing unit (CPU), a read only memory (ROM), and a random access memory (RAM) which are not illustrated. For example, various programs including an imaging processing program which is executed by the CPU and is used to perform control related to the capture of radiographic images are stored in the ROM in advance. The RAM temporarily stores various kinds of data.

For example, image data of a radiographic image captured by a radiation detector 28 and various other kinds of information are stored in the storage unit 22. A specific example of the storage unit 22 is a hard disk drive (HDD), a solid state drive (SSD), or the like. The I/F unit 24 transmits and receives various kinds of information to and from the console 12 using wireless communication or wired communication. The image data of the radiographic image captured by the radiation detector 28 in the mammography apparatus 10 is transmitted to the console 12 through the I/F unit 24 by wireless communication or wired communication.

In addition, as illustrated in FIG. 2, the radiation detector 28 is disposed in the imaging table 30. In the mammography apparatus 10 according to this embodiment, in a case in which imaging is performed, the breast of the subject is positioned on an imaging surface 30A of the imaging table 30 by a user. The radiation detector 28 detects the radiation R transmitted through the breast of the subject and the imaging table 30, generates a radiographic image on the basis of the detected radiation R, and outputs image data indicating the generated radiographic image. The type of the radiation detector 28 according to this embodiment is not particularly limited. For example, the radiation detector 28 may be an indirect-conversion-type radiation detector that converts the radiation R into light and converts the converted light into charge or may be a direct-conversion-type radiation detector that directly converts the radiation R into charge.

A radiation emitting unit 37 comprises a radiation source 37R. As illustrated in FIG. 2, the radiation emitting unit 37 is provided in an arm portion 32 together with the imaging table 30 and a compression unit 36. As illustrated in FIG. 2, a face guard 38 is attachably and detachably provided at a position of the arm portion 32 which is close to the subject below the radiation emitting unit 37. The face guard 38 is a protective member for protecting the subject from the radiation R emitted from the radiation source 37R.

In addition, as illustrated in FIG. 2, the mammography apparatus 10 according to this embodiment comprises the arm portion 32, a base 34, and a shaft portion 35. The arm portion 32 is held by the base 34 to be movable in an up-down direction (Z-axis direction). In addition, the arm portion 32 can be rotated with respect to the base 34 by the shaft portion 35. The shaft portion 35 is fixed to the base 34, and the shaft portion 35 and the arm portion 32 are rotated integrally.

Gears are provided in each of the shaft portion 35 and the compression unit 36. The gears can be switched between an engaged state and a non-engaged state to switch between a state in which the compression unit 36 and the shaft portion 35 are connected and rotated integrally and a state in which the shaft portion 35 is separated from the compression unit 36 and the imaging table 30 and runs idle. In addition, components for switching between transmission and non-transmission of power of the shaft portion 35 are not limited to the gears, and various mechanical elements may be used.

Each of the arm portion 32, the imaging table 30, and the compression unit 36 can be relatively rotated with respect to the base 34, using the shaft portion 35 as a rotation axis. In this embodiment, engagement portions (not illustrated) are provided in each of the base 34, the arm portion 32, the imaging table 30, and the compression unit 36. The state of the engagement portions is switched to connect each of the arm portion 32, the imaging table 30, and the compression unit 36 to the base 34. The arm portion 32, the imaging table 30, and the compression unit 36 connected to the shaft portion 35 are integrally rotated on the shaft portion 35.

The compression unit 36 is provided with a compression plate driving unit 41 that moves a compression plate 40 in the up-down direction (Z-axis direction). The compression plate 40 according to this embodiment has a function of compressing the breast of the subject. A support portion 46 of the compression plate 40 is detachably attached to the compression plate driving unit 41 and is moved in the up-down direction (Z-axis direction) by the compression plate driving unit 41 to compress the breast of the subject between the compression plate 40 and the imaging table 30.

Further, the mammography apparatus 10 according to this embodiment has a function of performing general imaging and a function of performing so-called contrast imaging that captures images in a state in which a contrast medium is injected into the breast of the subject. The mammography apparatus 10 according to this embodiment has a contrast enhanced digital mammography (CEDM) function of performing the contrast imaging using energy subtraction imaging as the function of performing the contrast imaging. In this embodiment, the "contrast imaging" means imaging that is performed in a state in which a contrast medium is injected into the breast (object) of the subject, and the "general imaging" means imaging that is not the contrast imaging.

In the contrast imaging, the breast, into which the contrast medium has been injected, is irradiated with the radiation R with first energy to capture a low-energy image. Further, in the contrast imaging, the breast is irradiated with the radiation R with second energy higher than the first energy to capture a high-energy image. In addition, in this embodiment, the radiographic image captured by emitting the radiation R with the first energy is referred to as a "low-energy image", and the radiographic image captured by emitting the radiation R with the second energy is referred to as a "high-energy image". Further, in a case in which mammographic images obtained by the mammography apparatus 10, such as a low-energy image, a high-energy image, and a difference image which will be described below, are generically referred to without being distinguished from each other according to the type, they are simply referred to as "radiographic images".

For example, an iodine contrast medium having a k-edge of 32 keV is generally used as the contrast medium used for the contrast imaging. In this case, in the contrast imaging, the radiation R with the first energy lower than the k-edge of the iodine contrast medium is emitted to capture the low-energy image. Further, the radiation R with the second energy higher than the k-edge of the iodine contrast medium is emitted to capture the high-energy image.

Radiation absorption characteristics are different between the contrast medium and body tissues such as mammary glands. Therefore, in the high-energy image captured as described above, the body tissues, such as the mammary glands and fat, are shown, and the contrast medium is clearly shown. Further, in the low-energy image, the contrast medium is hardly shown, and the body tissues, such as the mammary glands, are clearly shown. Therefore, a difference image indicating the difference between the low-energy image and the high-energy image can be an image in which a mammary gland structure has been removed and the contrast medium is clearly shown.

Further, the console 12 according to this embodiment has a function of controlling the mammography apparatus 10 using, for example, an imaging order and various kinds of information acquired from a radiology information system (RIS) 2 and the like through a wireless communication local area network (LAN) and the like and instructions input by the user through an operation unit 56 and the like.

Figure 3:
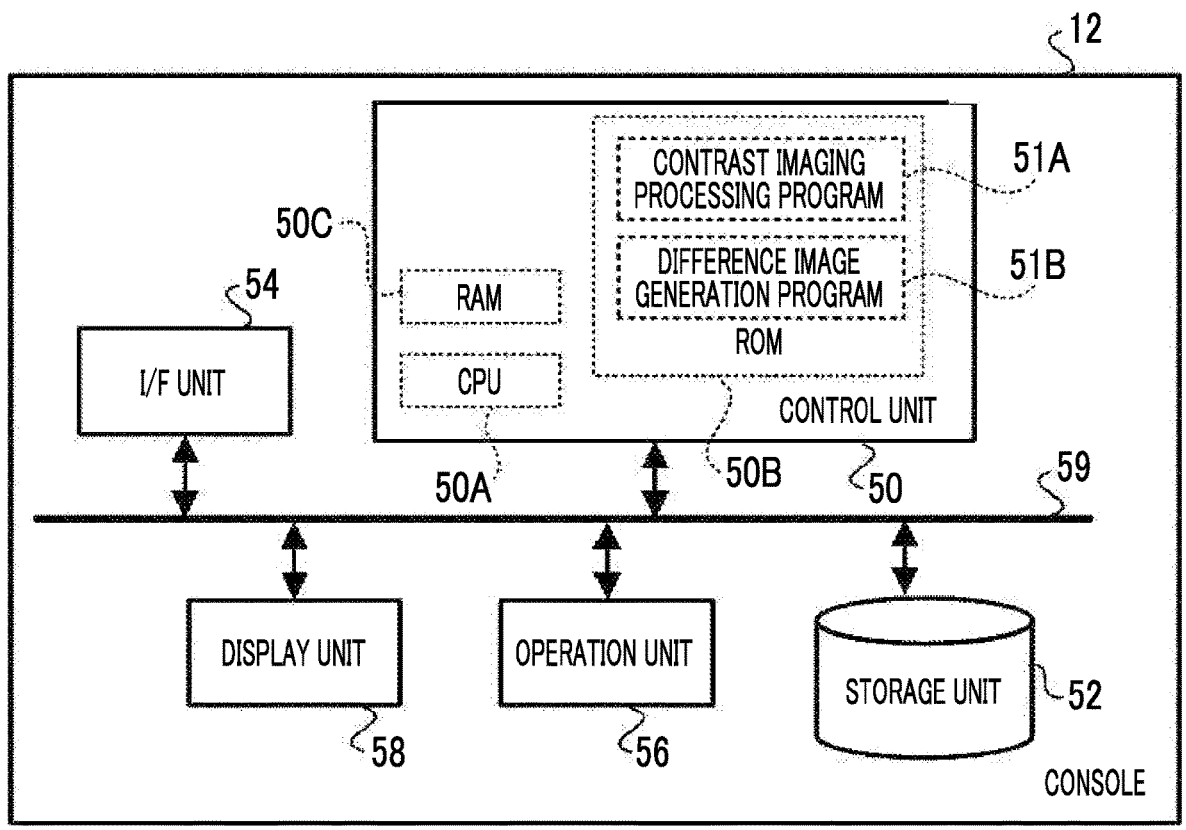
FIG. 3 is a block diagram illustrating an example of a configuration of a console according to the embodiment.

For example, the console 12 according to this embodiment is a server computer. As illustrated in FIG. 3, the console 12 comprises a control unit 50, a storage unit 52, an I/F unit 54, the operation unit 56, and a display unit 58. The control unit 50, the storage unit 52, the I/F unit 54, the operation unit 56, and the display unit 58 are connected to each other through a bus 59, such as a system bus or a control bus, such that they can transmit and receive various kinds of information.

The control unit 50 according to this embodiment controls the overall operation of the console 12. The control unit 50 comprises a CPU 50A, a ROM 50B, and a RAM 50C. Various programs including a contrast imaging processing program 51A and a difference image generation program 51B, which will be described below, executed by the CPU 50A are stored in the ROM 50B in advance. The RAM 50C temporarily stores various kinds of data. The CPU 50A according to this embodiment is an example of a processor according to the present disclosure. In addition, the difference image generation program 51B according to this embodiment is an example of an image processing program according to the present disclosure.

For example, the image data of the radiographic image captured by the mammography apparatus 10 and various other kinds of information are stored in the storage unit 52. A specific example of the storage unit 52 is an HDD, an SSD, or the like.

The operation unit 56 is used by the user to input, for example, instructions which are related to the capture of a radiographic image and which include an instruction to emit the radiation R or various kinds of information. The operation unit 56 is not particularly limited. Examples of the operation unit 56 include various switches, a touch panel, a touch pen, and a mouse. The display unit 58 displays various kinds of information. In addition, the operation unit 56 and the display unit 58 may be integrated into a touch panel display.

The I/F unit 54 transmits and receives various kinds of information between the mammography apparatus 10 and the RIS 2 using wireless communication or wired communication. In the radiography system 1 according to this embodiment, the console 12 receives the image data of the radiographic image captured by the mammography apparatus 10 from the mammography apparatus 10 through the I/F unit 54, using wireless communication or wired communication.

Figure 4:
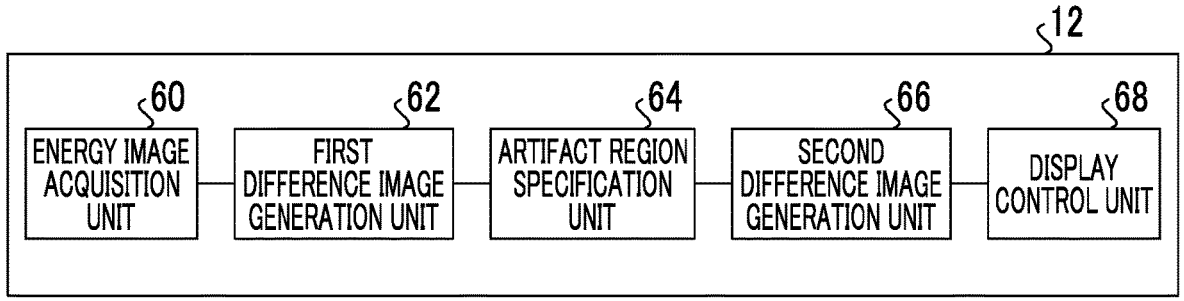
FIG. 4 is a functional block diagram illustrating an example of functions of the console according to the embodiment.

In addition, FIG. 4 is a functional block diagram illustrating an example of the configuration of the console 12 according to this embodiment. As illustrated in FIG. 4, the console 12 comprises an energy image acquisition unit 60, a first difference image generation unit 62, an artifact region specification unit 64, a second difference image generation unit 66, and a display control unit 68. For example, in the console 12 according to this embodiment, the CPU 50A of the control unit 50 executes the difference image generation program 51B stored in the ROM 50B to function as the energy image acquisition unit 60, the first difference image generation unit 62, the artifact region specification unit 64, the second difference image generation unit 66, and the display control unit 68.

The energy image acquisition unit 60 has a function of acquiring a low-energy image and a high-energy image obtained by the contrast imaging. Specifically, the energy image acquisition unit 60 acquires image data indicating the low-energy image and image data indicating the high-energy image captured by the contrast imaging with the radiation detector 28 of the mammography apparatus 10 through the I/F unit 24 and the I/F unit 54. The energy image acquisition unit 60 outputs the acquired low-energy image and high-energy image to the first difference image generation unit 62.

The first difference image generation unit 62 has a function of generating a first difference image indicating a difference between the high-energy image and the low-energy image. For example, the first difference image generation unit 62 according to this embodiment subtracts image data obtained by multiplying the low-energy image by a predetermined coefficient from image data obtained by multiplying the high-energy image by a predetermined coefficient for each corresponding pixel to generate image data of the first difference image. As an example of a weight coefficient, the following is used: a weight coefficient based on an absorption coefficient $\mu g^L$ of the mammary gland for the radiation R with the first energy, an absorption coefficient $\mu a^L$ of fat for the radiation R with the first energy, an absorption coefficient $\mu g^H$ of the mammary gland for the radiation R with the second energy, and an absorption coefficient $\mu a^H$ of fat for the radiation R with the second energy. Specifically, a weight coefficient α obtained by the following Expression (1) is used.

$$\alpha = (\mu g^L - \mu a^L)/(\mu g^H - \mu a^H) \tag{1}$$

Figure 5:
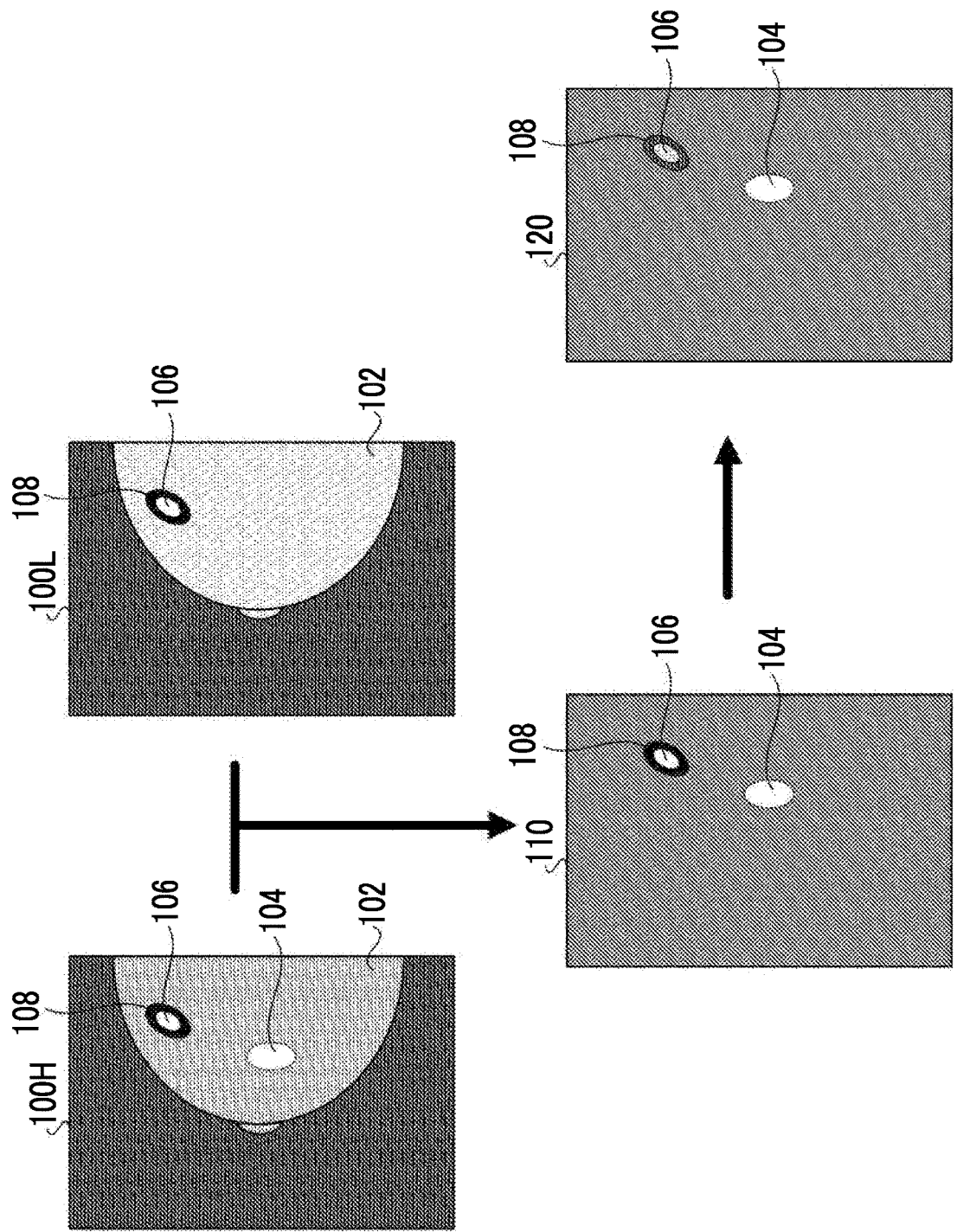
FIG. 5 is a diagram illustrating an example of a high-energy image, a low-energy image, a first difference image, and a second difference image.

As described above, a high-energy image 100H includes an image 102 of the breast (hereinafter, referred to as a "breast 102") which is a body tissue, such as the mammary gland or fat, and an image 104 of the contrast medium (hereinafter, referred to as a "contrast medium 104"), and the contrast medium 104 is clear in the high-energy image 100H, as illustrated in FIG. 5. On the other hand, a low-energy image 100L includes the breast 102 and does not include or rarely includes the contrast medium 104.

In addition, in a case in which the breast includes an artifact, each of the high-energy image 100H and the low-energy image 100L includes an image 106 of the artifact (hereinafter, referred to as an "artifact 106"). The artifact, at least, does not include the contrast medium. Examples of the artifact include markers present in the breast, biopsy needles in biopsies, and implants. In many cases, the artifact is composed of a material having a relatively high radiation absorbance such as metal. As illustrated in FIG. 5, the artifact 106 appears white, and the surroundings of the artifact 106 appear as a black image because a brightness value of the surroundings of the artifact 106 is reduced by an image 108 of an artifact component (hereinafter, referred to as an "artifact component 108"). Therefore, the contrast of an edge portion of the artifact 106 is relatively high.

As illustrated in FIG. 5, a first difference image 110 is an image in which a mammary gland tissue (breast 102) has been removed and the contrast medium 104 has been emphasized. In addition, the first difference image 110 is an image including the artifact 106 and the artifact component 108 generated by the artifact. The first difference image generation unit 62 outputs the generated first difference image 110 to the artifact region specification unit 64.

The artifact region specification unit 64 has a function of specifying an artifact region including the artifact from the first difference image 110. As described above, in the first difference image 110, the artifact 106 appears as a white image having a high brightness value. Further, since the artifact is composed of a material having a high radiation absorbance, the artifact 106 tends to have a higher brightness value than the contrast medium 104. Therefore, the artifact region specification unit 64 according to this embodiment uses a value that is larger than the brightness value of the contrast medium 104 and that is smaller than the brightness value of the artifact 106 as a threshold value and specifies a pixel having a brightness value equal to or larger than the threshold value among the pixels of the first difference image 110 as a pixel of the artifact 106 to specify the artifact region including the artifact 106. In addition, the brightness value of the contrast medium 104 included in the first difference image 110 changes depending on how the contrast medium penetrates the body tissue. Specifically, the degree of penetration of the contrast medium differs depending on whether a tumor is benign or malignant. In addition, the degree of penetration of the contrast medium differs depending on the elapsed time from the injection of the contrast medium to the washout of the contrast medium. Therefore, it is preferable that the threshold value used for specifying the artifact 106 is determined according to at least one of the type of contrast medium to be used, the type of object to be observed, or the elapsed time from the injection of the contrast medium to imaging. In addition, it is preferable that the threshold value used for specifying the artifact 106 is determined according to the thickness of the breast.

Information indicating the artifact region specified by the artifact region specification unit 64 is output to the second difference image generation unit 66.

The second difference image generation unit 66 generates a second difference image which indicates the difference between the high-energy image 100H and the low-energy image 100L and in which an influence of the artifact component 108 caused by the artifact has been suppressed on the basis of the artifact region. The second difference image generation unit 66 according to this embodiment performs, as image processing, an emphasis process, such as a gradation emphasis process or a frequency emphasis process, on the first difference image 110. In this emphasis process, the second difference image generation unit 66 prevents the artifact region including the artifact 106 from being emphasized more than a region other than the artifact region. In other words, the second difference image generation unit 66 performs the emphasis process which emphasizes the region other than the artifact region more than the artifact region on the first difference image 110. In addition, in the emphasis process, the artifact region may not be emphasized at all or may be emphasized more weakly than the region other than the artifact region. A second difference image 120 in which the edge of the artifact 106 is inconspicuous and the influence of the artifact component 108 has been suppressed is generated by this emphasis process.

The second difference image generation unit 66 outputs the generated second difference image 120 to the display control unit 68.

The display control unit 68 has a function of displaying the second difference image 120 on the display unit 58.

Next, the operation of the console 12 in the contrast imaging by the radiography system 1 according to this embodiment will be described with reference to the drawings.

Figure 6:
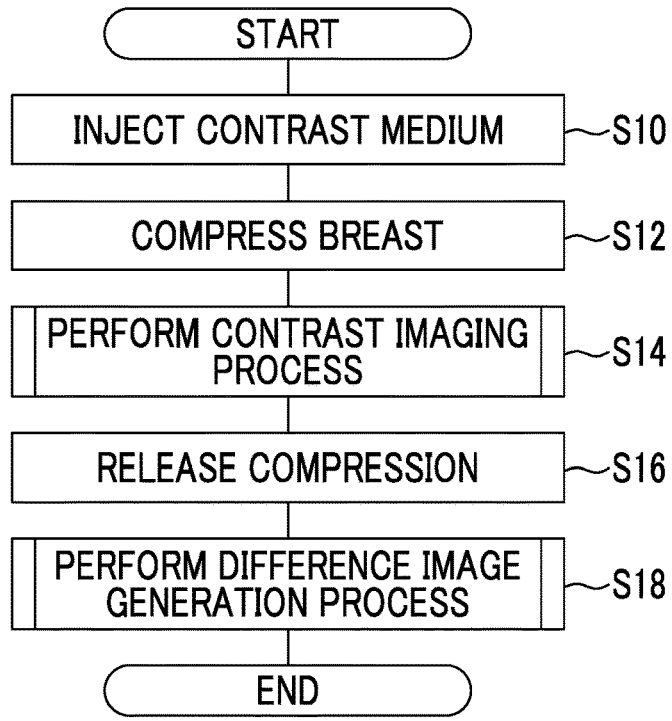
FIG. 6 is a flowchart illustrating an example of a flow of contrast imaging by the radiography system according to the embodiment.

FIG. 6 is a flowchart illustrating an example of the flow of the contrast imaging by the radiography system 1 according to this embodiment. In a case in which the contrast imaging is performed, first, the user injects the contrast medium into the breast as an object as illustrated in Step S10 of FIG. 6. Then, as illustrated in Step S12, the user positions the breast of the subject on the imaging table 30 of the mammography apparatus 10 and compresses the breast with the compression plate 40.

Figure 7:
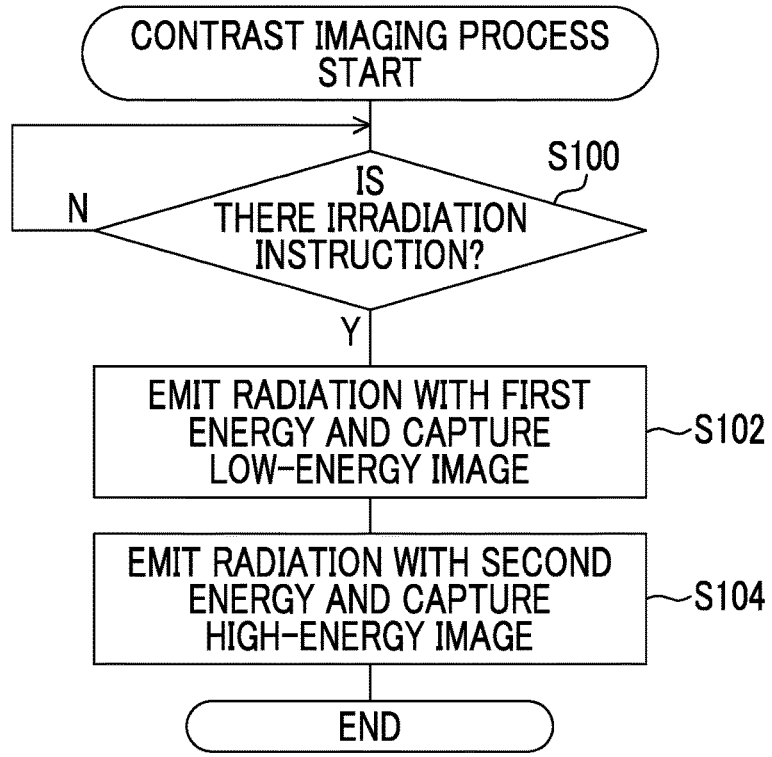
FIG. 7 is a flowchart illustrating an example of a flow of a contrast imaging process according to the embodiment.

Next, in Step S14, the console 12 performs a contrast imaging process for performing the contrast imaging using the mammography apparatus 10. FIG. 7 is a flowchart illustrating an example of the flow of the contrast imaging process performed in the console 12 according to this embodiment. In the console 12 according to this embodiment, for example, the CPU 50A of the control unit 50 executes the contrast imaging processing program 51A stored in the ROM 50B to perform the contrast imaging process whose example is illustrated in FIG. 7.

In Step S100 of FIG. 7, the control unit 50 determines whether or not an instruction to emit the radiation R is received. The determination result in Step S100 is "No" until the irradiation instruction is received. On the other hand, in a case in which the irradiation instruction is received, the determination result in Step S100 is "Yes", and the process proceeds to Step S102.

In Step S102, the control unit 50 outputs an instruction to emit the radiation R with the first energy to the mammography apparatus 10. In the mammography apparatus 10, the control unit 20 directs the radiation source 37R to emit the radiation R with the first energy to the breast on the basis of the instruction input from the console 12, and the radiation detector 28 captures the low-energy image.

Then, in Step S104, the control unit 50 outputs an instruction to emit the radiation R with the second energy to the mammography apparatus 10. In the mammography apparatus 10, the control unit 20 directs the radiation source 37R to emit the radiation R with the second energy to the breast on the basis of the instruction input from the console 12, and the radiation detector 28 captures the high-energy image.

In addition, the order in which the low-energy image and the high-energy image are captured is not limited to this embodiment, and the high-energy image may be captured before the low-energy image. That is, the order of the process in Step S102 and the process in Step S104 may be interchanged.

In a case in which the contrast imaging process illustrated in FIG. 7 ends in this way, the contrast imaging process in Step S14 illustrated in FIG. 6 ends. Further, the control unit 50 may notify the user that the contrast imaging has ended.

Then, in Step S16, the compression of the breast is released. Specifically, the control unit 50 outputs an instruction to move the compression plate 40 in a direction away from the imaging table 30 to the mammography apparatus 10. In the mammography apparatus 10, the control unit 50 moves the compression plate 40 in the direction away from the imaging table 30 on the basis of the input instruction. The compression of the breast is released by this process. In addition, the release of the compression of the breast may be performed in response to an instruction from the user or may be automatically performed according to the end of the contrast imaging.

Figure 8:
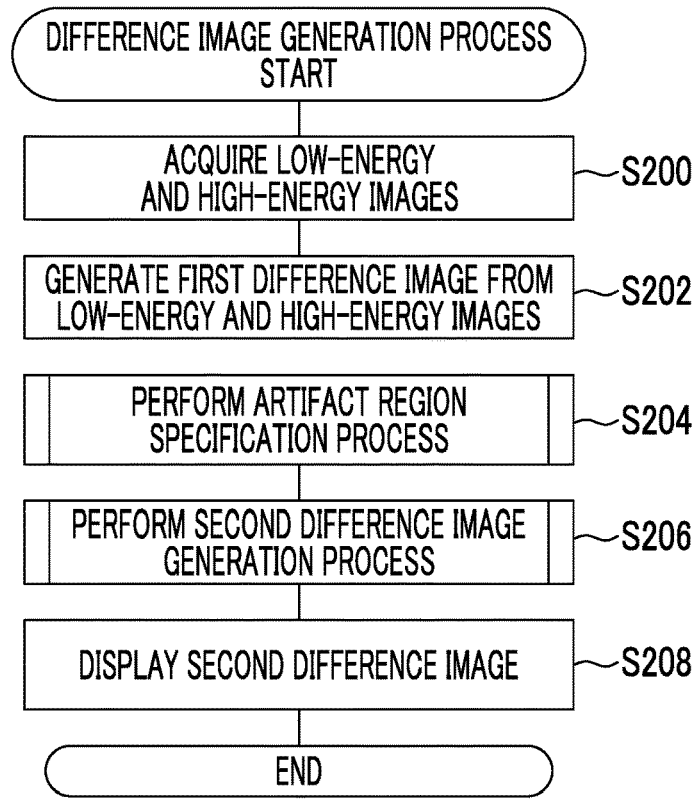
FIG. 8 is a flowchart illustrating an example of a flow of a difference image generation process according to the embodiment.

Then, in Step S18, the console 12 performs a difference image generation process for generating the second difference image. FIG. 8 is a flowchart illustrating an example of the flow of the difference image generation process performed in the console 12 according to this embodiment. In the console 12 according to this embodiment, for example, the CPU 50A of the control unit 50 executes the difference image generation program 51B stored in the ROM 50B to perform the difference image generation process whose example is illustrated in FIG. 8.

In Step S200, the energy image acquisition unit 60 acquires the low-energy image 100L and the high-energy image 100H obtained by the contrast imaging as described above.

Then, in Step S202, the first difference image generation unit 62 generates the first difference image 110 from the low-energy image 100L and from the high-energy image 100H as described above.

Figure 9:
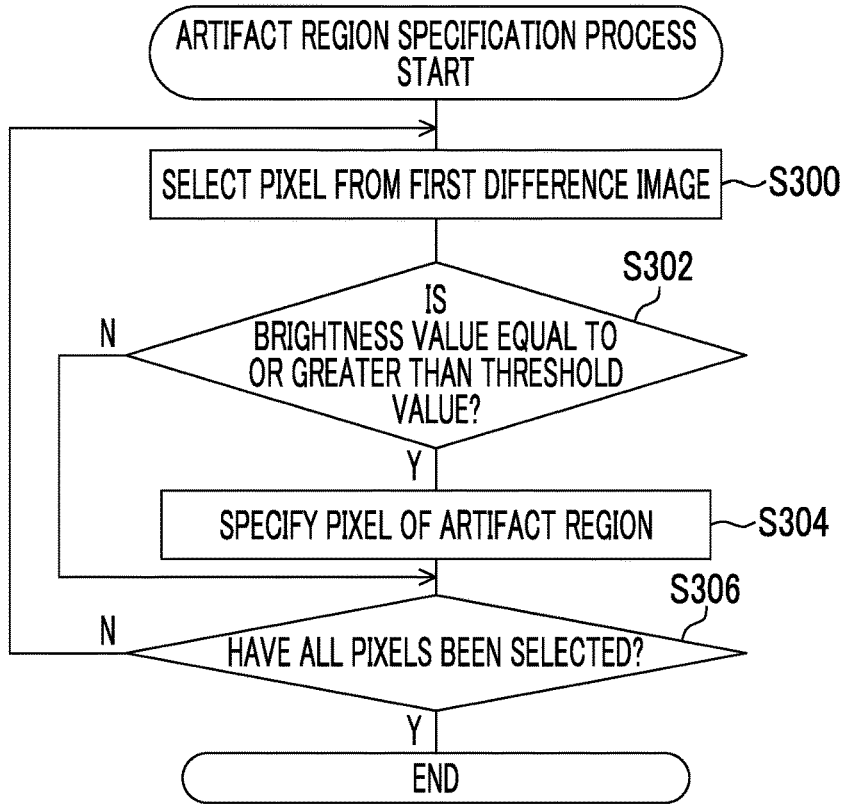
FIG. 9 is a flowchart illustrating an example of a flow of an artifact region specification process in the difference image generation process according to the embodiment.

Then, in Step S204, the artifact region specification unit 64 executes an artifact region specification process for specifying the artifact region including the artifact 106 from the first difference image 110 generated in Step S202. FIG. 9 is a flowchart illustrating an example of the flow of the artifact region specification process according to this embodiment.

In Step S300 of FIG. 9, the artifact region specification unit 64 selects a pixel from the first difference image 110. In addition, the pixel selected here is preferably one pixel. However, a plurality of adjacent pixels may be selected in consideration of a load on the process.

Then, in Step S302, the artifact region specification unit 64 determines whether or not the brightness value of the pixel selected in Step S300 is equal to or greater than a threshold value for specifying the artifact 106. In a case in which the brightness value is not equal to or greater than the threshold value, that is, in a case in which the brightness value is less than the threshold value, the determination result in Step S302 is "No", and the process proceeds to Step S306. On the other hand, in a case in which the brightness value is equal to or greater than the threshold value, the determination result in Step S302 is "Yes", and the process proceeds to Step S304.

In Step S304, the artifact region specification unit 64 specifies the pixel having a brightness value equal to or greater than the threshold value, that is, the pixel selected in Step S300, as the pixel of the artifact region.

Then, in Step S306, the artifact region specification unit 64 determines whether or not all of the pixels of the first difference image 110 have been selected in Step S300. That is, the artifact region specification unit 64 determines whether or not the determination of whether or not the selected pixel is the pixel of the artifact region has been performed for all of the pixels of the first difference image 110. In a case in which all of the pixels are not selected, the determination result in Step S306 is "No", and the process returns to Step S300. Then, a new pixel is selected, and the processes in Steps S300 to S304 are repeated. On the other hand, in a case in which all of the pixels are selected, the determination result in Step S306 is "Yes", and the artifact region specification process illustrated in FIG. 9 ends.

As described above, in the artifact region specification process illustrated in FIG. 9, the region of the pixels specified as the artifact region is specified as the artifact region.

In a case in which the artifact region specification process illustrated in FIG. 9 ends, Step S204 of the difference image generation process illustrated in FIG. 8 ends, and the process proceeds to Step S206.

Figure 10:
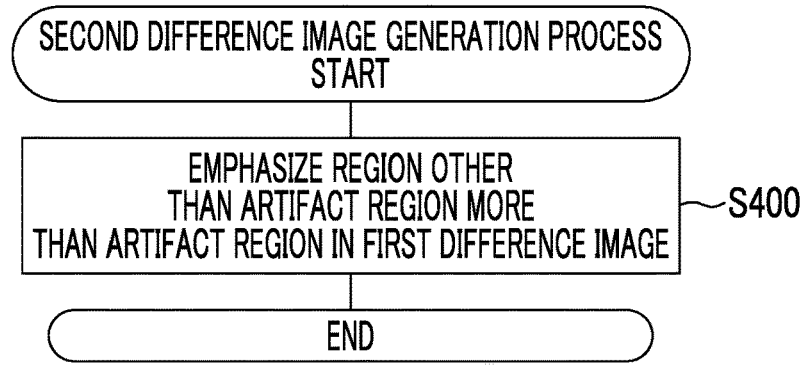
FIG. 10 is a flowchart illustrating an example of a flow of a second difference image generation process in the difference image generation process according to the embodiment.

In Step S206, the second difference image generation unit 66 performs a second difference image generation process for generating the second difference image 120, in which the influence of the artifact component caused by the artifact has been suppressed, on the basis of the artifact region specified in Step S204. FIG. 10 is a flowchart illustrating an example of the flow of the second difference image generation process according to this embodiment.

In Step S400 of FIG. 10, the second difference image generation unit 66 performs the emphasis process that emphasizes the region other than the artifact region more than the artifact region on the first difference image 110 as described above. The emphasis process is performed on the first difference image 110 in this way to generate the second difference image 120 in which the edge of the artifact 106 is inconspicuous and the influence of the artifact component 108 has been suppressed.

In a case in which the second difference image generation process illustrated in FIG. 10 ends, Step S206 of the difference image generation process illustrated in FIG. 8 ends, and the process proceeds to Step S208.

Then, in Step S208, the display control unit 68 performs control to display the second difference image generated in Step S206 on the display unit 58.

In addition, the display aspect of displaying the second difference image on the display unit 58 is not particularly limited. For example, in addition to the difference image, the low-energy image and the high-energy image may be displayed on the display unit 58.

In a case in which the process in Step S208 ends, the difference image generation process illustrated in FIG. 8 ends. In a case in which the difference image generation process illustrated in FIG. 8 ends in this way, the difference image generation process in Step S18 in the contrast imaging illustrated in FIG. 6 ends. In addition, the low-energy image, the high-energy image, the first difference image, and the second difference image may be stored in the storage unit 52 of the console 12, a picture archiving and communication system (PACS), or the like.

In a case in which the process of Step S18 ends, a series of processes related to the contrast imaging according to this embodiment illustrated in FIG. 6 ends.

In addition, the above-described difference image generation process is an example, and various modification examples are possible. For example, the difference image generation process may be performed as in the following modification examples.

Modification Example 1: Modification Example of Artifact Region Specification Process In this modification example, a modification example of the artifact region specification process (Step S204 in FIG. 8) in the difference image generation process will be described.

As described above, the artifact is composed of a material having a relatively high radiation absorbance. Therefore, as the energy of the radiation emitted becomes lower, the amount of radiation absorbed becomes larger. That is, the amount of radiation with the first energy absorbed by the artifact is sufficiently larger than the amount of radiation with the second energy absorbed by the artifact. For example, the amount of radiation with the first energy absorbed by the artifact is about twice the amount of radiation with the second energy absorbed by the artifact. Meanwhile, since the contrast medium has the above-described k-edge, the amount of radiation with the first energy absorbed by the contrast medium is relatively smaller than the amount of radiation with the first energy absorbed by the artifact. Therefore, the artifact region specification unit 64 according to this modification example compares the amount of radiation absorbed in the high-energy image 100H and the amount of radiation absorbed in the low-energy image 100L to specify the artifact region. That is, the artifact region specification unit 64 compares the pixel values of the corresponding pixels in the high-energy image and in the low-energy image and specifies the pixel whose brightness value in the low-energy image is larger than the brightness value in the high-energy image as the pixel of the artifact region.

Figure 11A:
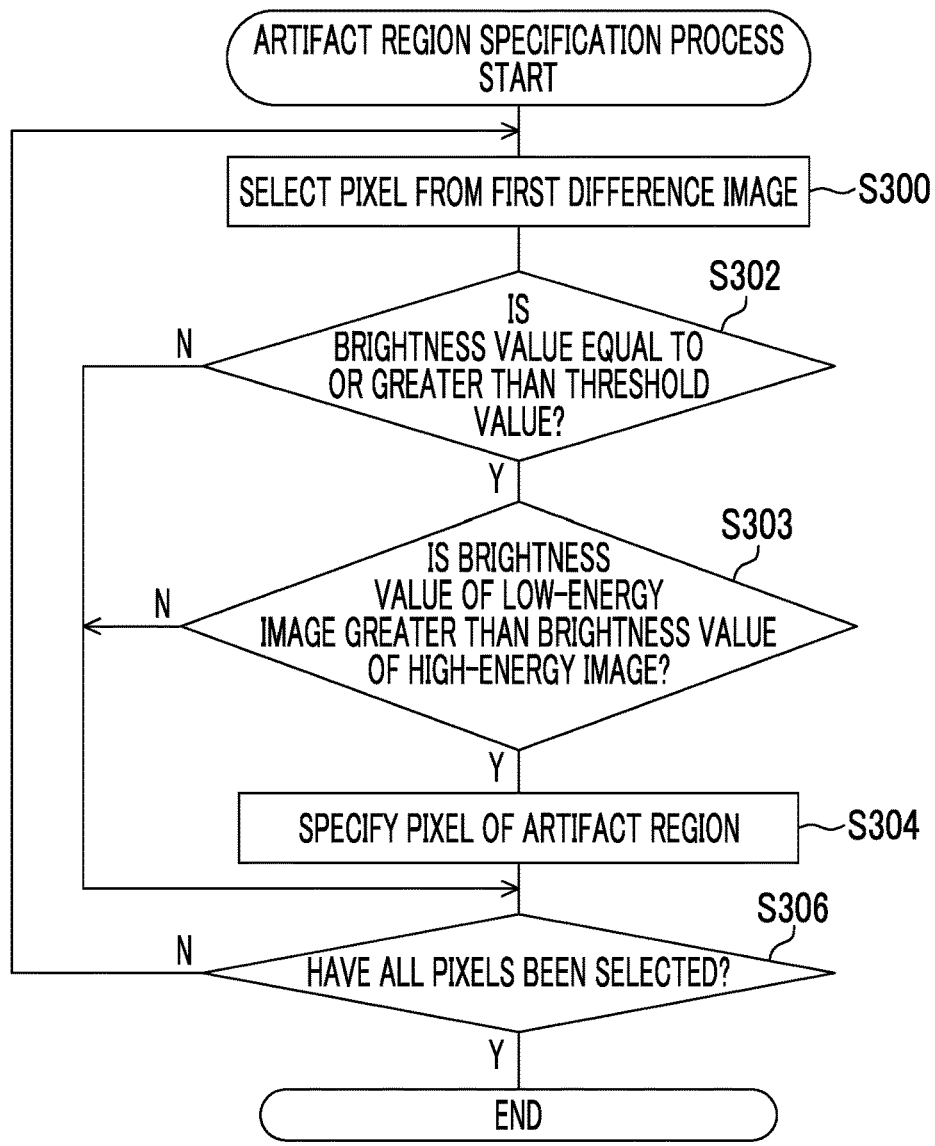
FIG. 11A is a flowchart illustrating an example of a flow of an artifact region specification process according to Modification Example 1.

FIG. 11A is a flowchart illustrating an example of the flow of the artifact region specification process in the difference image generation process according to this modification example. The artifact region specification process according to this modification example illustrated in FIG. 11A is different from the artifact region specification process (see FIG. 9) according to the above-described embodiment in that it comprises a process in Step S303 between Steps S302 and S304.

As illustrated in FIG. 11A, in this modification example, in a case in which the brightness value of the selected pixel is equal to or greater than the threshold value, the determination result in Step S302 is "Yes", and the process proceeds to Step S303.

In Step S303 of FIG. 11A, the artifact region specification unit 64 determines whether or not the brightness value of the low-energy image 100L is larger than the brightness value of the high-energy image 100H for the pixel selected in Step S300. In a case in which the brightness value of the low-energy image 100L is not larger than the brightness value of the high-energy image 100H, that is, in a case in which the brightness value of the low-energy image 100L is equal to or less than the brightness value of the high-energy image 100H, the determination result in Step S303 is "No", and the process proceeds to Step S306. On the other hand, in a case in which the brightness value of the low-energy image 100L is larger than the brightness value of the high-energy image 100H, the determination result in Step S303 is "Yes", and the process proceeds to Step S304.

As described above, in this modification example, the artifact region including the artifact 106 is specified from the first difference image 110 including the contrast medium 104 and the artifact 106 on the basis of the difference between the amounts of radiation absorbed by the contrast medium and the artifact. Therefore, according to this modification example, it is possible to more accurately specify the artifact region.

Modification Example 2: Modification Example of Artifact Region Specification Process In this modification example, a modification example of the artifact region specification process (Step S204 in FIG. 8) in the difference image generation process will be described.

Figure 11B:
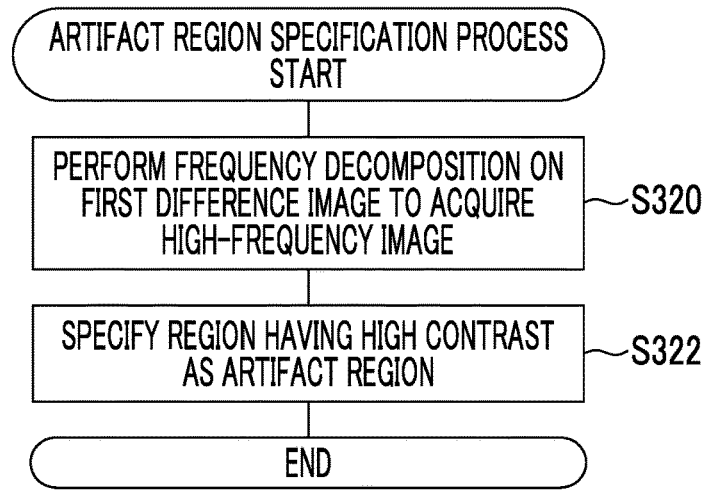
FIG. 11B is a flowchart illustrating an example of a flow of an artifact region specification process according to Modification Example 2.

FIG. 11B is a flowchart illustrating an example of the flow of the artifact region specification process in the difference image generation process according to this modification example.

In Step S320 of FIG. 11B, the artifact region specification unit 64 performs frequency decomposition on the first difference image 110 to acquire a high-frequency image. That is, the artifact region specification unit 64 performs frequency decomposition on the first difference image 110 to detect the edges of the contrast medium 104 and the artifact 106. For example, the artifact region specification unit 64 applies a high-pass filter to the first difference image 110 to acquire a high-frequency image.

Then, in Step S322, the artifact region specification unit 64 specifies a region having high contrast from the high-frequency image acquired in Step S320 as the artifact region including the artifact 106. The contrast of an edge portion of the artifact 106 included in the first difference image 110 is higher than the contrast of an edge portion of the contrast medium 104 due to the artifact component 108 around the artifact 106 (see also FIG. 5). Therefore, for example, the average value of the contrast of the edge portion of the contrast medium 104 is obtained as a contrast threshold value in advance, and a region surrounded by the edge having a contrast greater than the contrast threshold value can be set as the artifact region including the artifact 106. Therefore, the artifact region specification unit 64 specifies a region having a contrast greater than the above-mentioned average value as the artifact region.

In a case in which the process in Step S322 ends, the artifact region specification process according to this modification example illustrated in FIG. 11B ends.

Modification Example 3: Modification Example of Artifact Region Specification Process In this modification example, a modification example of the artifact region specification process (Step S204 in FIG. 8) in the difference image generation process will be described.

Figure 11C:
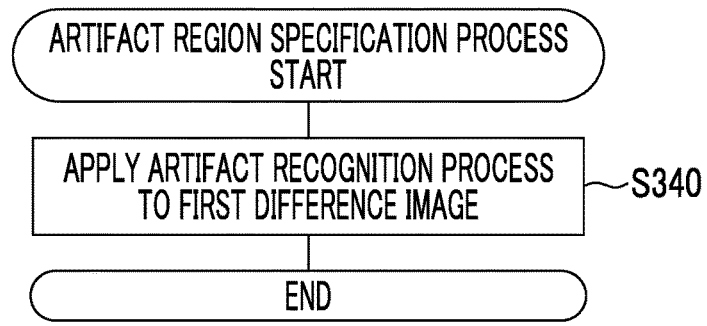
FIG. 11C is a flowchart illustrating an example of a flow of an artifact region specification process according to Modification Example 3.

FIG. 11C is a flowchart illustrating an example of the flow of the artifact region specification process in the difference image generation process according to this modification example.

In Step S340 of FIG. 11C, the artifact region specification unit 64 applies an artifact recognition process for recognizing the artifact 106 to the first difference image 110. As the artifact recognition process, a plurality of templates corresponding to, for example, the type of the artifact 106 are prepared, and the artifact region specification unit 64 performs template matching on the first difference image 110 to recognize the artifact 106 and specifies the artifact region including the artifact 106. Further, for example, computer aided diagnosis (CAD) may be applied to the first difference image 110 to recognize the artifact 106, and the artifact region including the artifact 106 may be specified. Furthermore, for example, the artifact region may be specified by applying a trained machine learning model that has been trained with training data including a plurality of sets of the first difference image 110 including the artifact 106 and information indicating the artifact region in the first difference image 110 and a plurality of sets of the first difference image 110, which does not include the artifact 106, and information indicating the artifact region in the first difference image 110 such that, in a case in which the first difference image 110 is input, the trained machine learning model outputs the artifact region in the first difference image 110.

In a case in which the process in Step S340 ends, the artifact region specification process according to this modification example illustrated in FIG. 11C ends.

According to this modification example, the artifact recognition process can be applied to specify the artifact region. Therefore, it is possible to easily specify the artifact region.

Modification Example 4: Modification Example of Difference Image Generation Process In this modification example, a modification example of the second difference image generation process (Step S206 in FIG. 8) in the difference image generation process will be described.

The second difference image generation unit 66 according to this modification example performs the emphasis process, such as the gradation emphasis process or the frequency emphasis process, as image processing on the low-energy image 100L and on the high-energy image 100H, instead of on the first difference image 110.

Figure 12A:
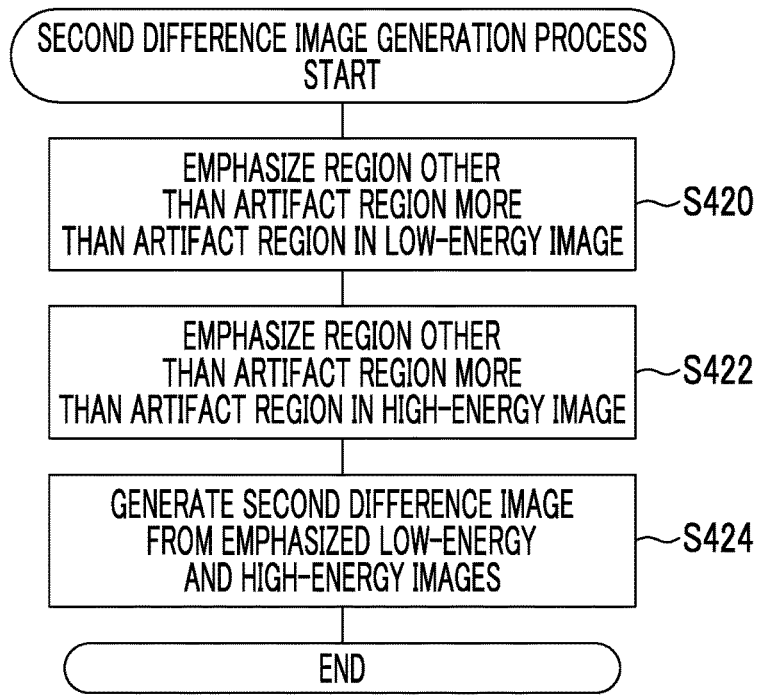
FIG. 12A is a flowchart illustrating an example of a flow of a second difference image generation process according to Modification Example 4.

FIG. 12A is a flowchart illustrating an example of the flow of the second difference image generation process in the difference image generation process according to this modification example.

In Step S420 of FIG. 12A, the second difference image generation unit 66 performs the emphasis process, which emphasizes a region other than the artifact region more than the artifact region, on the low-energy image 100L. Specifically, the second difference image generation unit 66 specifies the artifact region in the low-energy image 100L which corresponds to the artifact region specified in the first difference image 110. Then, the emphasis process that emphasizes the region other than the artifact region more than the artifact region in the low-energy image 100L is performed. The emphasis process performed here is the same process as the above-described emphasis process (see Step S400 in FIG. 10) performed on the first difference image 110.

The edge of the artifact 106 is inconspicuous in the low-energy image 100L, and the influence of the artifact component 108 is suppressed by performing the emphasis process in this way.

Then, in Step S422, the second difference image generation unit 66 performs the emphasis process, which emphasizes the region other than the artifact region more than the artifact region, on the high-energy image 100H. Specifically, the second difference image generation unit 66 specifies the artifact region in the high-energy image 100H which corresponds to the artifact region specified in the first difference image 110. Then, the emphasis process that emphasizes the region other than the artifact region more than the artifact region in the high-energy image 100H is performed. The emphasis process performed here is the same process as the above-described emphasis process (see Step S400 in FIG. 10) performed on the first difference image 110.

The edge of the artifact 106 is inconspicuous in the high-energy image 100H, and the influence of the artifact component 108 is suppressed by performing the emphasis process in this way.

Then, in Step S424, the second difference image generation unit 66 generates the second difference image 120 from the low-energy image 100L subjected to the emphasis process in Step S420 and from the high-energy image 100H subjected to the emphasis process in Step S422. That is, the second difference image generation unit 66 generates the second difference image 120 from the low-energy image 100L and from the high-energy image 100H in which the influence of the artifact component 108 has been suppressed. The second difference image 120 can be generated by the same method as that by which the first difference image generation unit 62 generates the first difference image 110 from the low-energy image 100L and from the high-energy image 100H.

In a case in which the process in Step S424 ends, the second difference image generation process according to this modification example illustrated in FIG. 12A ends.

As described above, according to this modification example, the low-energy image 100L and the high-energy image 100H in which the influence of the artifact component 108 caused by the artifact has been suppressed are further obtained. Therefore, in a case in which the user also interprets the low-energy image 100L and the high-energy image 100H, it is possible to provide the low-energy image 100L and the high-energy image 100H in which the influence of the artifact component 108 caused by the artifact has been suppressed.

Modification Example 5: Modification Example of Difference Image Generation Process In this modification example, a modification example of the second difference image generation process (Step S206 in FIG. 8) in the difference image generation process will be described.

The second difference image generation unit 66 according to this modification example performs a process for suppressing the artifact component in a case in which the second difference image 120 is generated from the low-energy image 100L and from the high-energy image 100H.

Figure 12B:
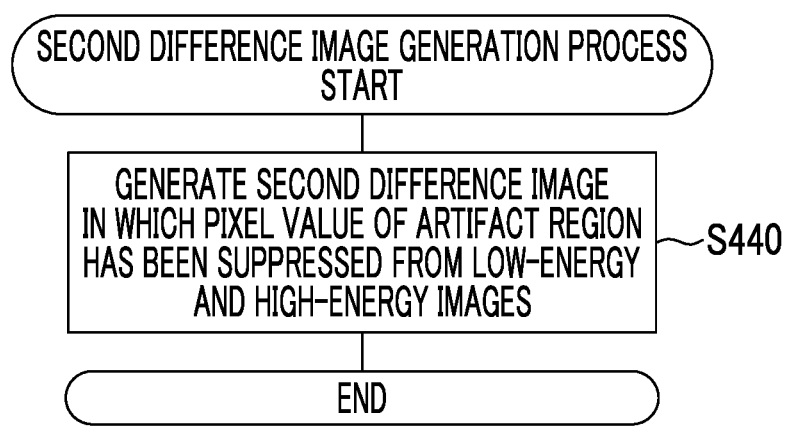
FIG. 12B is a flowchart illustrating an example of a flow of a second difference image generation process according to Modification Example 5.

FIG. 12B is a flowchart illustrating an example of the flow of the second difference image generation process in the difference image generation process according to this modification example.

In Step S440 of FIG. 12B, the second difference image generation unit 66 generates the second difference image 120, in which the pixel value of the artifact region has been suppressed, from the low-energy image 100L and from the high-energy image 100H. For example, the second difference image generation unit 66 generates the second difference image 120 which indicates the difference between the high-energy image 100H and the low-energy image 100L and in which the pixel value of the artifact region is smaller than the pixel value of the artifact region in the first difference image 110. In addition, a method for reducing the pixel value of the artifact region in the second difference image 120 is not limited. For example, the pixel value of the artifact region in the second difference image 120 may be replaced with the pixel value around the artifact region or a pixel value similar to the average value of the surrounding pixel values. Further, for example, the pixel value of the artifact region in the second difference image 120 may be uniformly set to a predetermined value or less. Furthermore, for example, a non-linear function may be applied to the contrast of the artifact region in the second difference image 120 to reduce the pixel value.

In a case in which the process in Step S440 ends, the second difference image generation process according to this modification example illustrated in FIG. 12B ends.

As described above, according to this modification example, the process of generating the second difference image 120 from the low-energy image 100L and from the high-energy image 100H includes a process of suppressing the artifact component.

As described above, the energy image acquisition unit 60 of the console 12 according to the above-described embodiment acquires the low-energy image 100L captured by irradiating the breast, into which the contrast medium has been injected, with the radiation having the first energy emitted from the radiation source 37R and detecting the radiation with the radiation detector 28, and the high-energy image 100H captured by irradiating the breast with the radiation having the second energy higher than the first energy emitted from the radiation source 37R and detecting the radiation with the radiation detector 28. The first difference image generation unit 62 generates the first difference image 110 indicating the difference between the high-energy image 100H and the low-energy image 100L and acquires the first difference image 110. The artifact region specification unit 64 specifies the artifact region including the artifact 106 from the first difference image 110. The second difference image generation unit 66 generates the second difference image 120 which indicates the difference between the high-energy image 100H and the low-energy image 100L and in which the influence of the artifact component 108 caused by the artifact has been suppressed on the basis of the artifact region.

In the first difference image 110 indicating the difference between the high-energy image 100H and the low-energy image 100L, the influence of the artifact component 108 caused by the artifact is large, and it is difficult to see the tissue stained with the contrast medium 104. In particular, in a case in which an emphasis process for making the contrast medium 104 easier to see is performed, the artifact region including the artifact 106 may be overemphasized, which makes it difficult to see the tissues or the like stained with the contrast medium 104.

In contrast, in this embodiment, the artifact region including the artifact 106 is specified from the first difference image 110, and the second difference image 120, in which the influence of the artifact component 108 caused by the artifact has been suppressed on the basis of the specified artifact region, is generated.

Therefore, according to the console 12 of the above-described embodiment, it is possible to obtain the second difference image 120, in which the contrast medium is clearly shown and the influence of the artifact component 108 caused by the artifact has been suppressed, in the contrast imaging.

For example, in a case in which the artifact is a biopsy needle, the influence of the artifact component 108 caused by the biopsy needle is suppressed in the second difference image 120. Therefore, it is possible to easily see the tissue which has been stained with the contrast medium 104 and which is collected by the biopsy needle and to easily collect the tissue.

Figure 13:
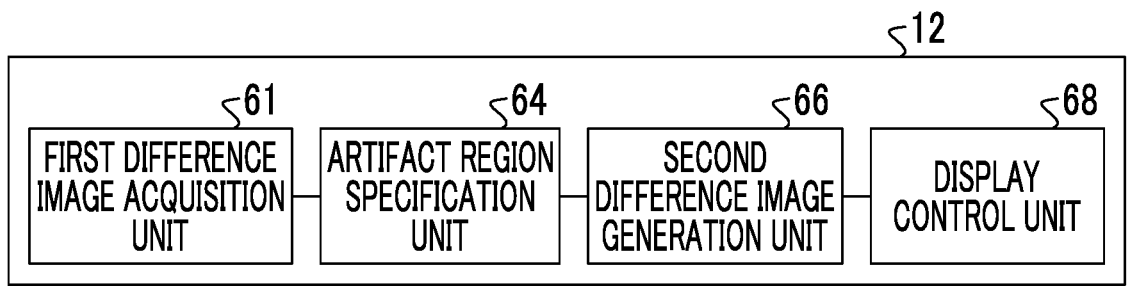
FIG. 13 is a functional block diagram illustrating another example of the functions of the console according to the embodiment.

Further, in the difference image generation process, in a case in which the artifact region specification process is any of the artifact region specification processes illustrated in FIG. 9, FIG. 11B, and FIG. 11C and the second difference image generation process is the artifact region specification process illustrated in FIG. 10, the console 12 may be configured to comprise a first difference image acquisition unit 61 having a function of acquiring the first difference image 110, instead of the energy image acquisition unit 60 and the first difference image generation unit 62 as illustrated in FIG. 13. In this case, the first difference image acquisition unit 61 acquires the first difference image 110 generated by a device outside the console 12. The console 12 illustrated in FIG. 13 may not acquire the low-energy image 100L and the high-energy image 100H.

Further, in the above-described embodiment, the aspect has been described in which each of the radiation with the first energy and the radiation with the second energy is emitted at one irradiation position without moving the position of the radiation source 37R to capture the low-energy image 100L and the high-energy image 100H. However, for example, the above-described embodiment can be applied to the contrast imaging in stereoscopic imaging in which radiation is emitted at a plurality of irradiation positions to capture a plurality of radiographic images or to tomosynthesis imaging. In the tomosynthesis imaging, the above-described embodiment is applied to obtain a tomographic image in which the influence of the artifact component caused by the artifact has been suppressed. Therefore, it is possible to more accurately derive the three-dimensional position of the tissue stained with the contrast medium.

Further, the console 12 according to the above-described embodiment specifies the artifact region. However, the console 12 may derive the position of the artifact on the basis of the specified artifact region and display information indicating the derived position of the artifact on the display unit 58.

In addition, in the above-described embodiment, the case in which the artifact is present in the breast has been described. However, the position where the artifact is present is not limited to the breast. The artifact may be present outside the breast. Even in this case, the same process as that in the above-described embodiment can be performed to suppress the influence of the artifact component caused by the artifact in the second difference image 120.

In addition, in the above-described embodiment, the aspect in which the breast is applied as an example of the object according to the present disclosure and the mammography apparatus 10 is applied as an example of the radiography apparatus according to the present disclosure has been described. However, the object is not limited to the breast, and the radiography apparatus is not limited to the mammography apparatus. For example, the object may be a chest, an abdomen, or the like, and radiography apparatuses other than the mammography apparatus may be applied.

Further, in the above-described embodiment, the aspect in which the difference image generation process is continuously performed after the process in Step S16 of FIG. 6 ends has been described. However, the time when the difference image generation process is performed, that is, the time when the second difference image 120 is generated, is not limited to this embodiment. For example, the second difference image 120 may be generated at the time corresponding to the desire of the user who interprets images after the contrast imaging.

Further, in the above-described embodiment, the aspect in which the console 12 is an example of the image processing device according to the present disclosure has been described. However, devices other than the console 12 may have the functions of the image processing device according to the present disclosure. In other words, for example, the mammography apparatus 10 or an external device other than the console 12 may have some or all of the functions of the energy image acquisition unit 60, the first difference image generation unit 62, the artifact region specification unit 64, the second difference image generation unit 66, and the display control unit 68.

In addition, in the above-described embodiment, for example, the following various processors can be used as a hardware structure of processing units performing various processes, such as the energy image acquisition unit 60, the first difference image generation unit 62, the artifact region specification unit 64, the second difference image generation unit 66, and the display control unit 68. The various processors include, for example, a programmable logic device (PLD), such as a field programmable gate array (FPGA), that is a processor whose circuit configuration can be changed after manufacture, and a dedicated electric circuit, such as an application specific integrated circuit (ASIC), that is a processor having a dedicated circuit configuration designed to perform a specific process, in addition to the CPU that is a general-purpose processor which executes software (programs) to function as various processing units as described above.

One processing unit may be configured by one of the various processors or by a combination of two or more processors of the same type or different types (for example, a combination of a plurality of FPGAs or a combination of a CPU and an FPGA). Further, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured using one or more of the various processors as a hardware structure.

In addition, specifically, an electric circuit (circuitry) obtained by combining circuit elements, such as semiconductor elements, can be used as the hardware structure of the various processors.

Further, in the above-described embodiment, the aspect in which the contrast imaging processing program 51A and the difference image generation program 51B are stored (installed) in the ROM 50B in advance has been described. However, the present disclosure is not limited thereto. Each of the contrast imaging processing program 51A and the difference image generation program 51B may be recorded on a recording medium, such as a compact disc read only memory (CD-ROM), a digital versatile disc read only memory (DVD-ROM), or a universal serial bus (USB) memory, and then be provided. Furthermore, each of the contrast imaging processing program 51A and the difference image generation program 51B may be downloaded from an external device through the network.

What is claimed is:

1. An image processing device comprising at least one processor configured to execute a process that includes:
    acquiring a first difference image indicating a difference between a low-energy image captured by irradiating an object, into which a contrast medium has been injected, with radiation having first energy emitted from a radiation source and detecting the radiation with a radiation detector and a high-energy image captured by irradiating the object with radiation having second energy higher than the first energy emitted from the radiation source and detecting the radiation with the radiation detector,
    specifying an artifact region including an artifact, whose amount of absorption of the radiation having the first energy is greater than whose amount of absorption of the radiation having the second energy, from the first difference image, and
    generating a second difference image which indicates the difference between the high-energy image and the low-energy image and in which a contrast of an edge portion of the artifact has been suppressed on the basis of the artifact region,
    wherein the edge portion is a region where a brightness value of the surroundings of the artifact is reduced, and
    wherein the processor sets a pixel as a pixel of the artifact region if a brightness value in the first difference image is equal to or greater than a predetermined value, and if a brightness value in the low-energy image is greater than a brightness value in the high-energy image.

2. The image processing device according to claim 1, wherein the processor performs image processing based on the artifact region on the first difference image to generate the second difference image.

3. The image processing device according to claim 2, wherein the image processing is an emphasis process that emphasizes a region other than the artifact region more than the artifact region.

4. The image processing device according to claim 1, wherein the processor acquires the low-energy image and the high-energy image, and generates the second difference image from the high-energy image and from the low-energy image on the basis of the artifact region.

5. The image processing device according to claim 4, wherein the processor performs image processing based on the artifact region on the high-energy image and on the low-energy image to generate the second difference image indicating a difference between the high-energy image and the low-energy image subjected to the image processing.

6. The image processing device according to claim 5, wherein the image processing is an emphasis process that emphasizes a region other than the artifact region more than the artifact region.

7. The image processing device according to claim 4, wherein the processor generates the second difference image which indicates the difference between the high-energy image and the low-energy image and in which a pixel value of the artifact region is smaller than a pixel value of the artifact region in the first difference image.

8. An image processing method executed by a computer, the image processing method comprising:
    acquiring a first difference image indicating a difference between a low-energy image captured by irradiating an object, into which a contrast medium has been injected, with radiation having first energy emitted from a radiation source and detecting the radiation with a radiation detector and a high-energy image captured by irradiating the object with radiation having second energy higher than the first energy emitted from the radiation source and detecting the radiation with the radiation detector;
    specifying an artifact region including an artifact, whose amount of absorption of the radiation having the first energy is greater than whose amount of absorption of the radiation having the second energy, from the first difference image; and
    generating a second difference image which indicates the difference between the high-energy image and the low-energy image and in which a contrast of an edge portion of the artifact has been suppressed on the basis of the artifact region,
    wherein the edge portion is a region where a brightness value of the surroundings of the artifact is reduced, and
    wherein a pixel is set as a pixel of the artifact region if a brightness value in the first difference image is equal to or greater than a predetermined value, and if a brightness value in the low-energy image is greater than a brightness value in the high-energy image.

9. A non-transitory computer-readable storage medium storing an image processing program that causes a computer to execute a process comprising:
    acquiring a first difference image indicating a difference between a low-energy image captured by irradiating an object, into which a contrast medium has been injected, with radiation having first energy emitted from a radiation source and detecting the radiation with a radiation detector and a high-energy image captured by irradiating the object with radiation having second energy higher than the first energy emitted from the radiation source and detecting the radiation with the radiation detector;

specifying an artifact region including an artifact, whose amount of absorption of the radiation having the first energy is greater than whose amount of absorption of the radiation having the second energy, from the first difference image; and generating a second difference image which indicates the difference between the high-energy image and the low-energy image and in which a contrast of an edge portion of the artifact has been suppressed on the basis of the artifact region, wherein the edge portion is a region where a brightness value of the surroundings of the artifact is reduced, and wherein a pixel is set as a pixel of the artifact region if a brightness value in the first difference image is equal to or greater than a predetermined value, and if a brightness value in the low-energy image is greater than a brightness value in the high-energy image.

* * * * *